Figure 7:
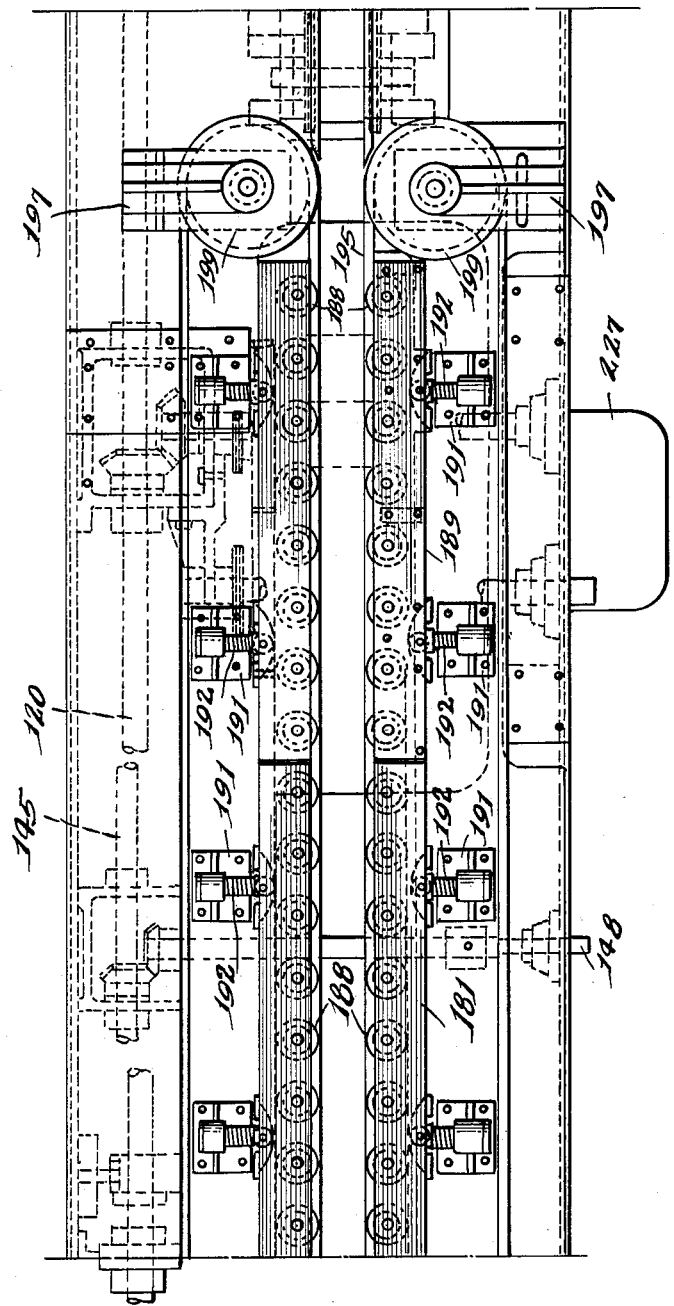

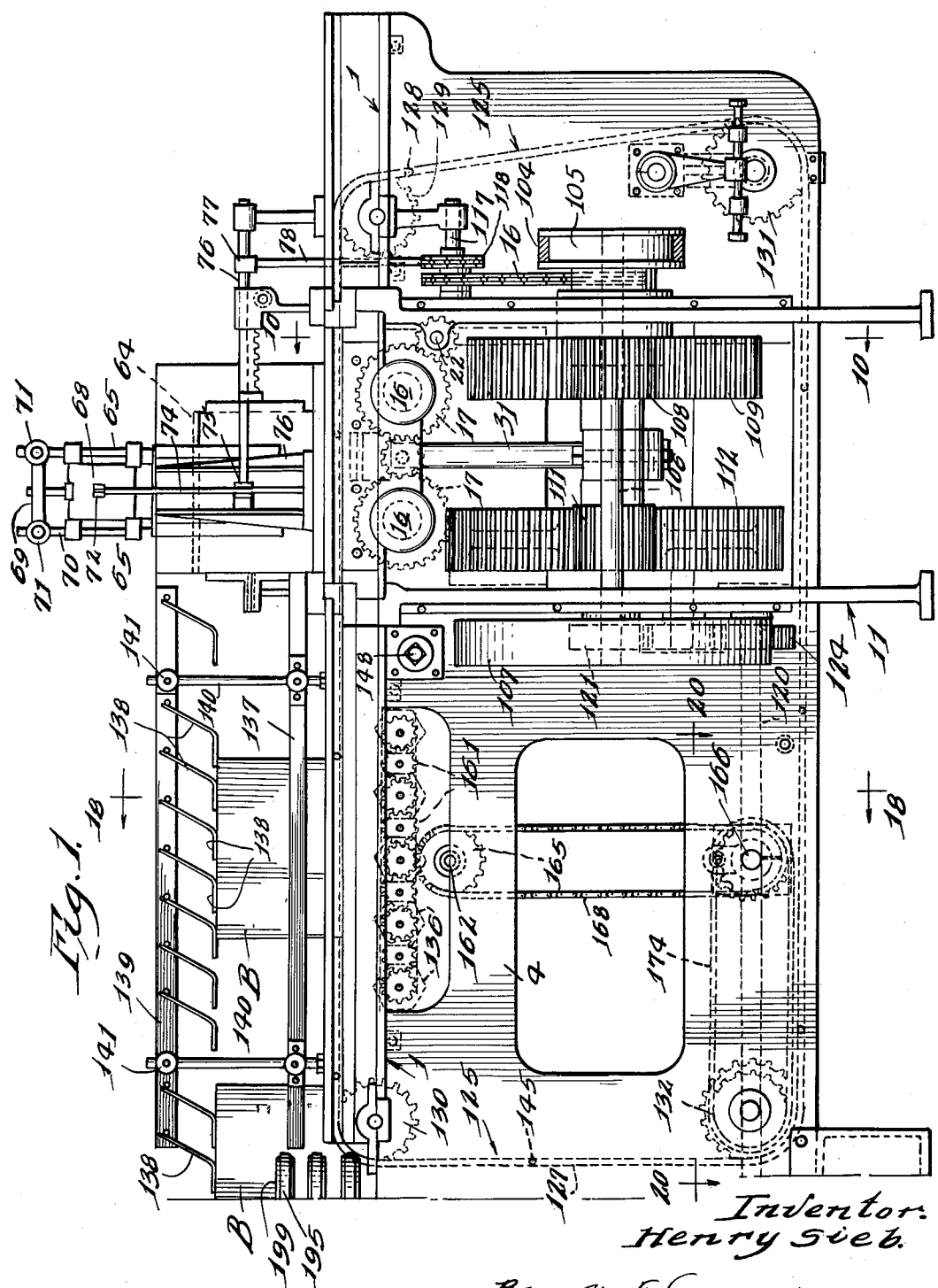

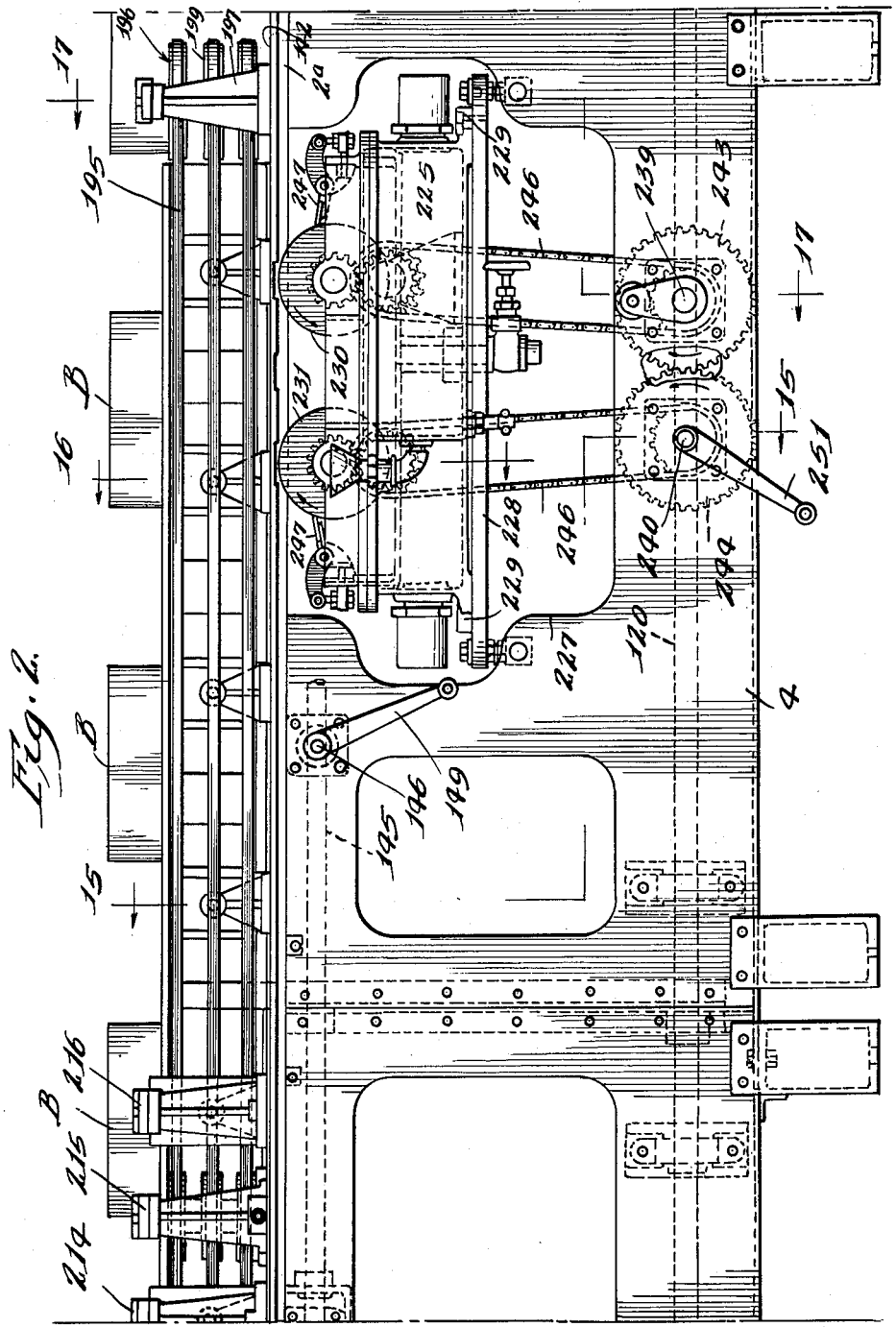

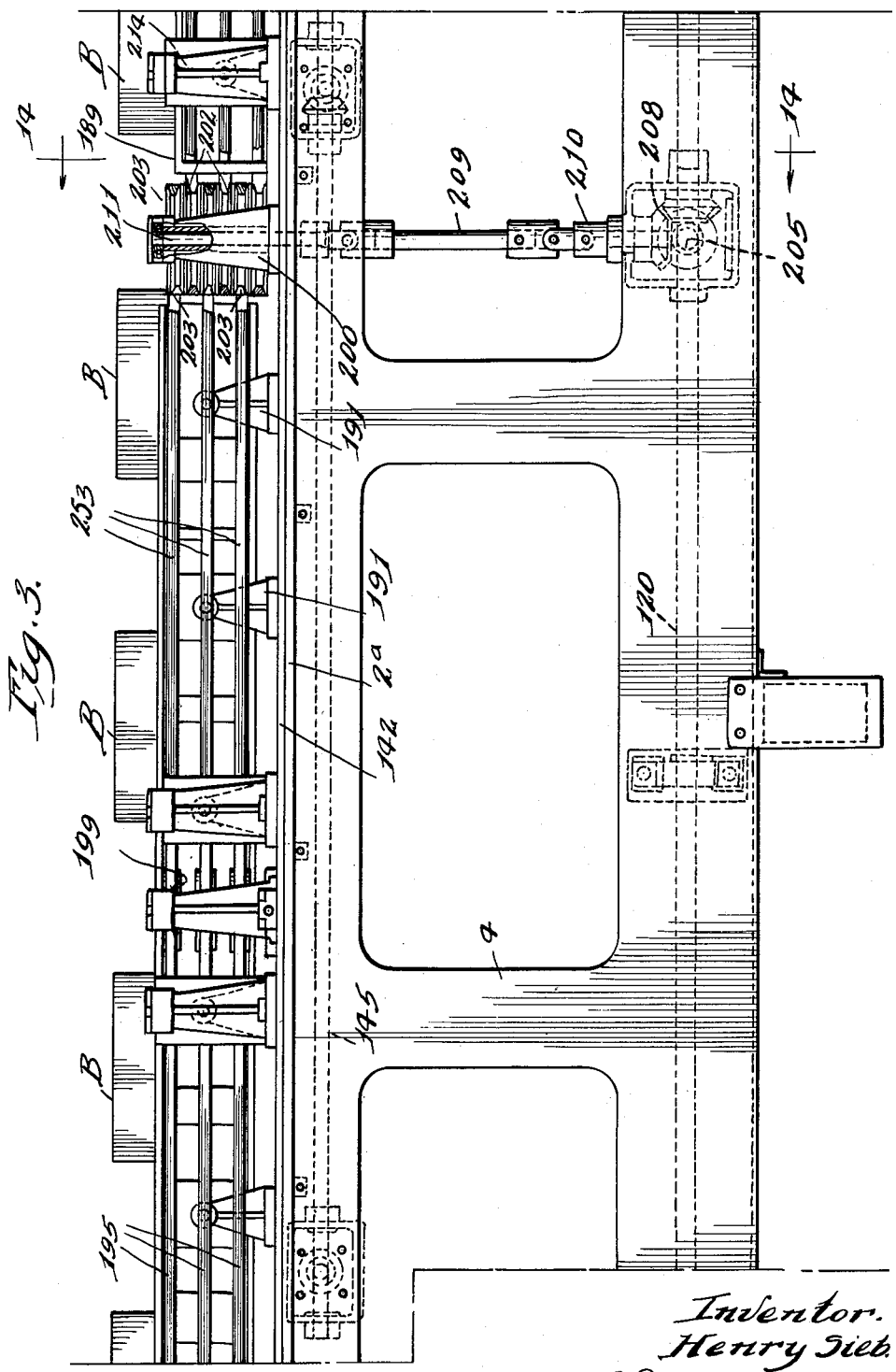

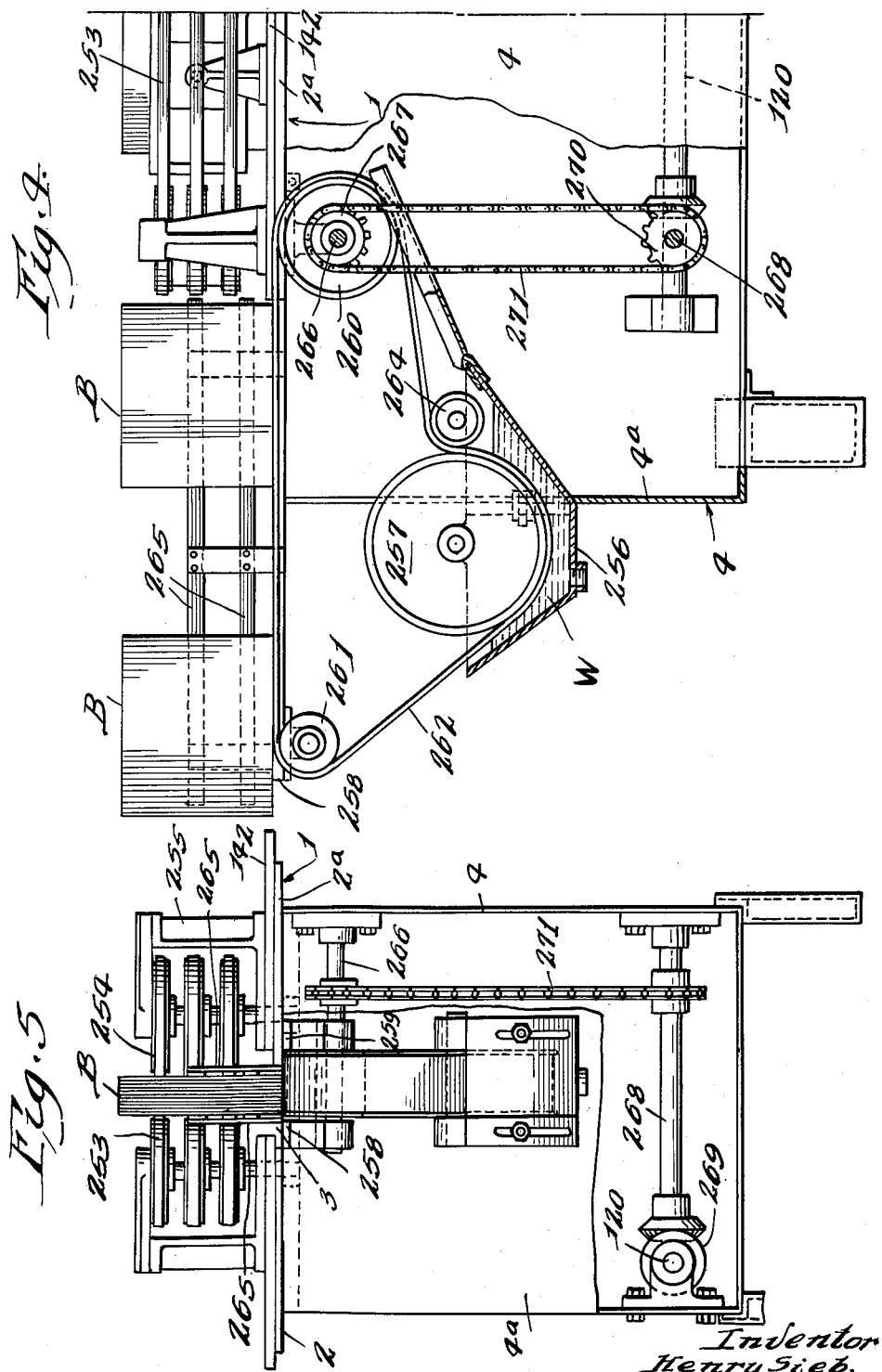

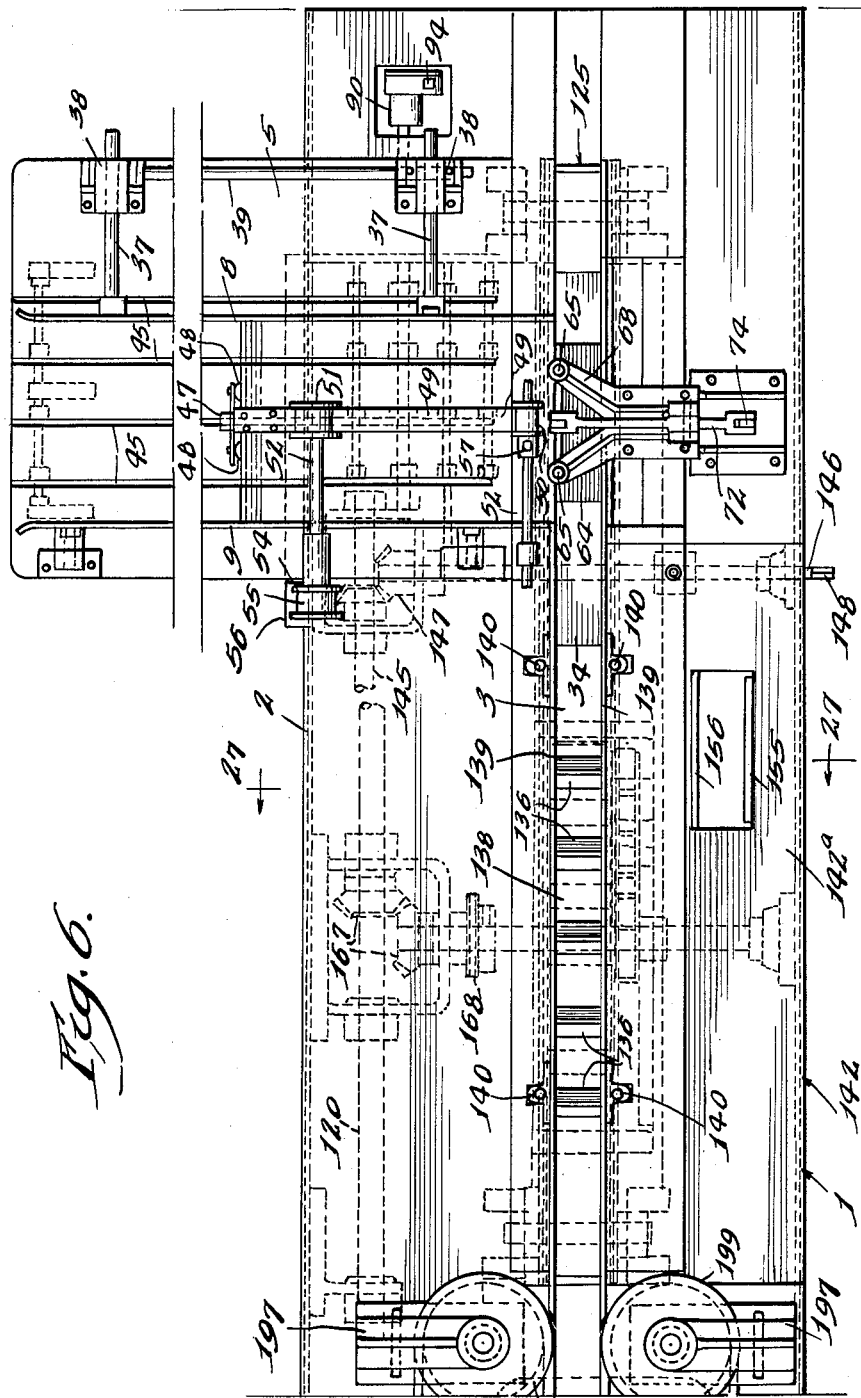

July 5, 1955  H. SIEB  2,712,141
MACHINE FOR GLUING BOOKS
Filed June 5, 1950  15 Sheets-Sheet 6

Inventor.
Henry Sieb.
By. Wm F. Freudenreich,
Attorney.

July 5, 1955 — H. SIEB — 2,712,141
MACHINE FOR GLUING BOOKS
Filed June 5, 1950 — 15 Sheets-Sheet 8

Inventor.
Henry Sieb.
By. Wm. F. Freudenreich,
Attorney.

July 5, 1955  H. SIEB  2,712,141
MACHINE FOR GLUING BOOKS
Filed June 5, 1950  15 Sheets-Sheet 9
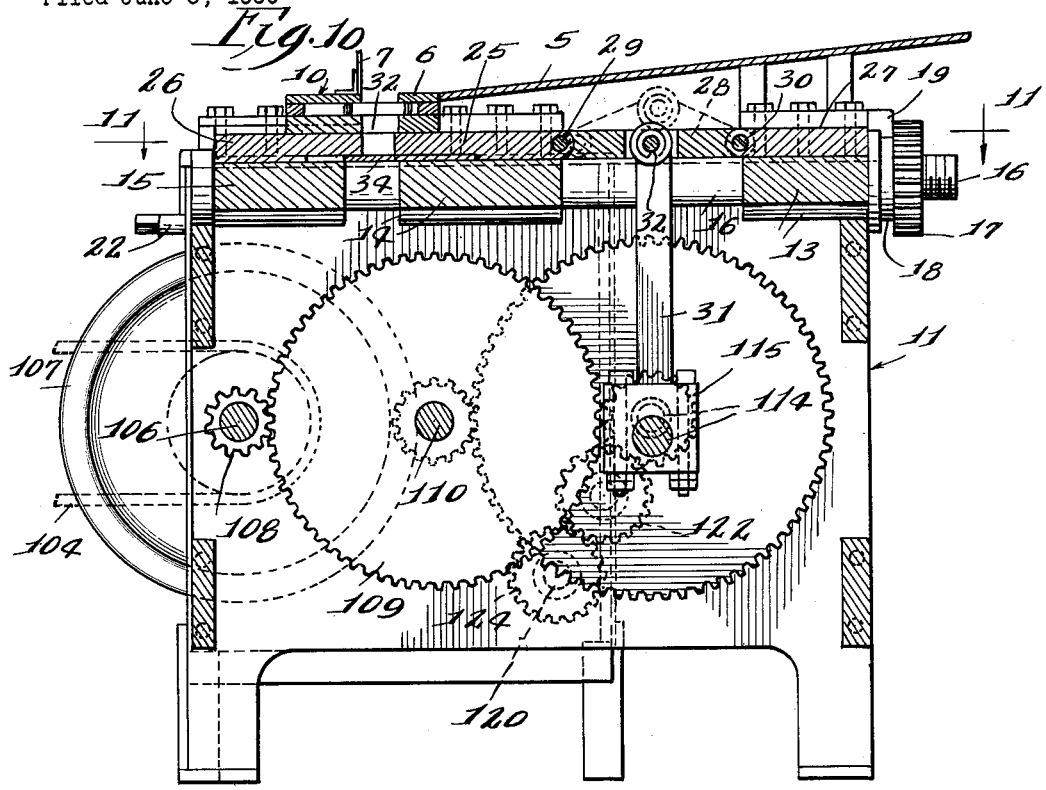
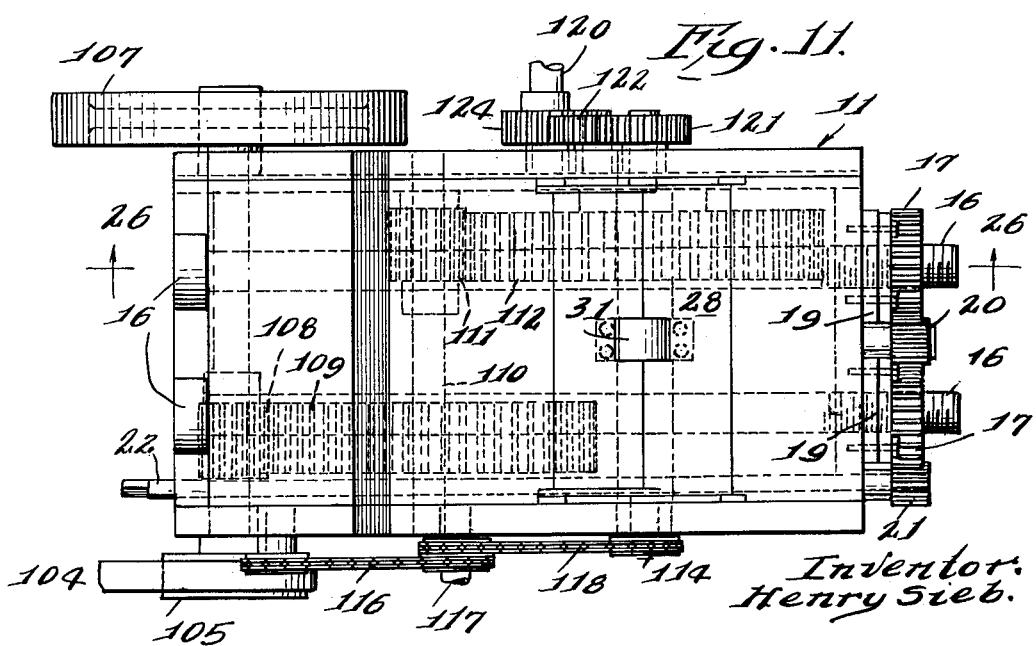
Inventor:
Henry Sieb.
By Wm F. Freudenreich,
Attorney.

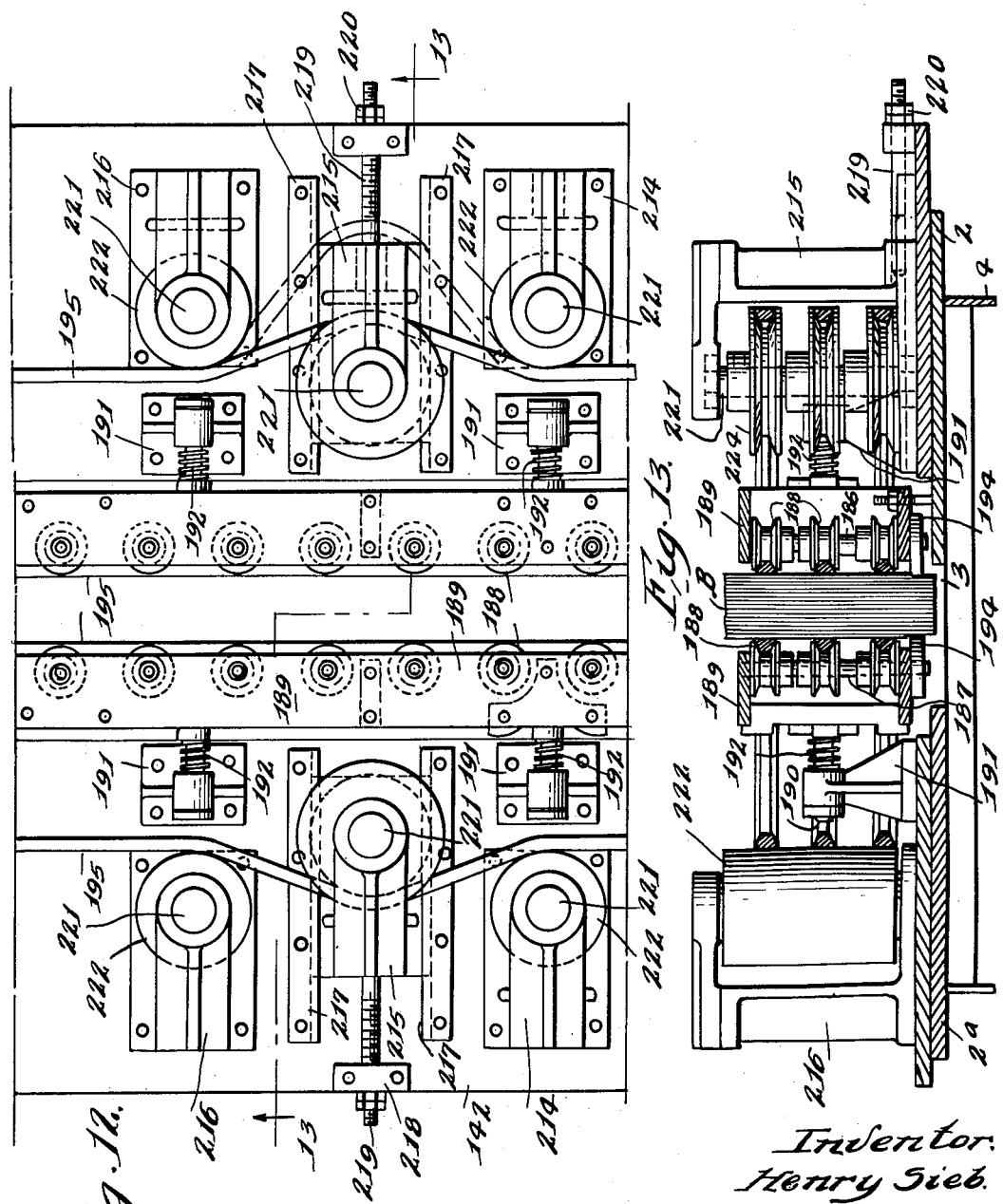

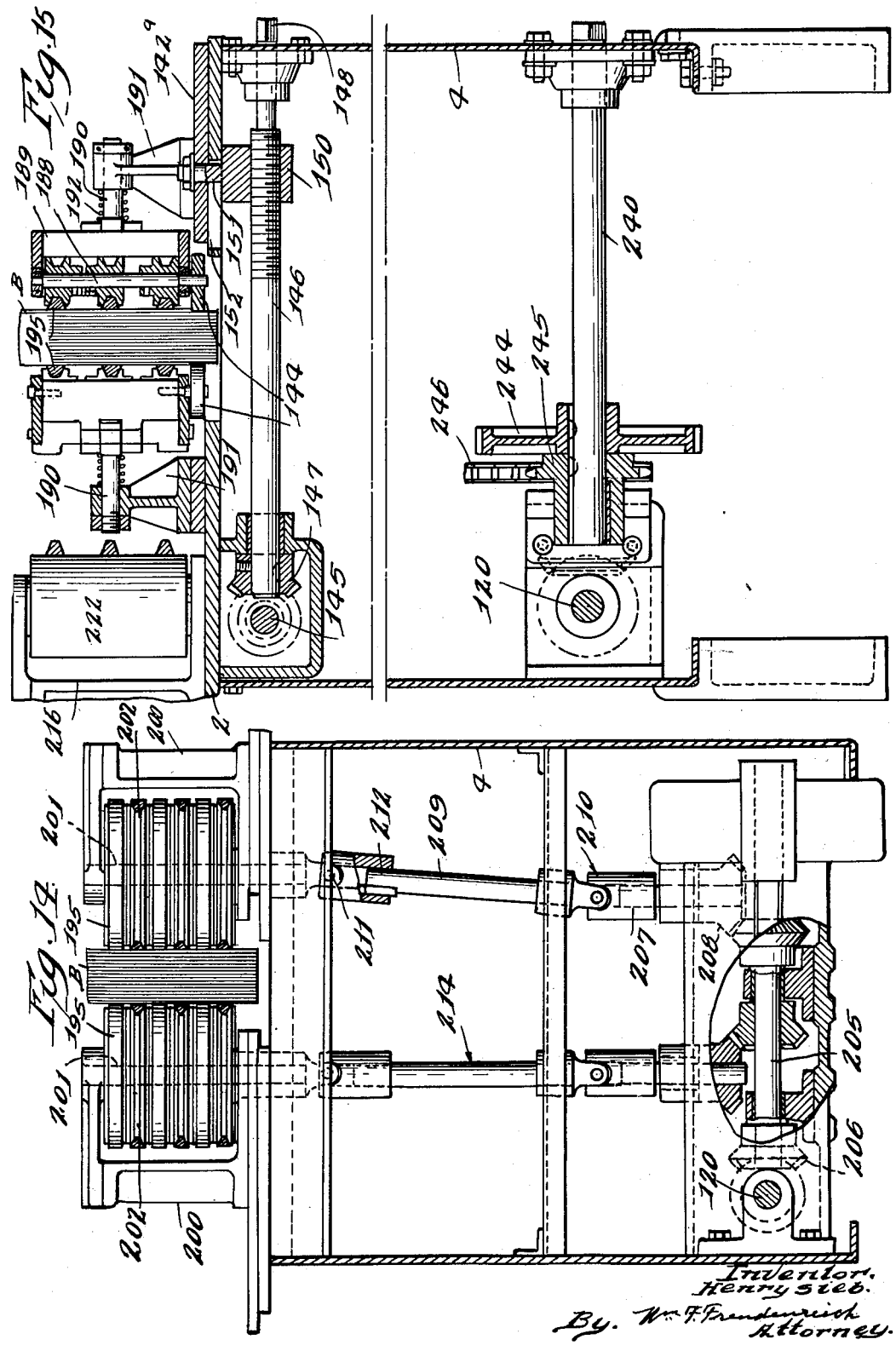

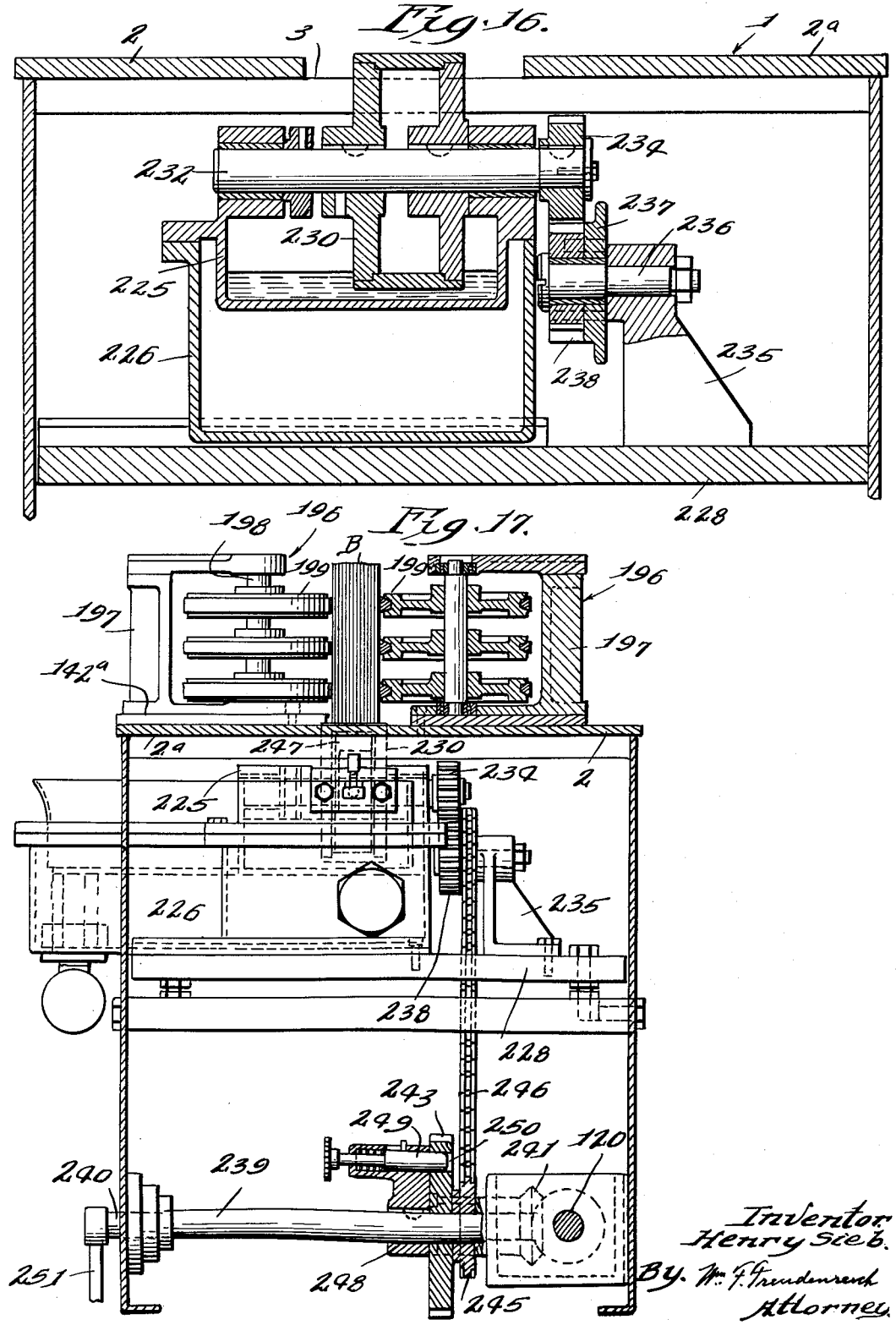

July 5, 1955  H. SIEB  2,712,141
MACHINE FOR GLUING BOOKS
Filed June 5, 1950  15 Sheets-Sheet 13
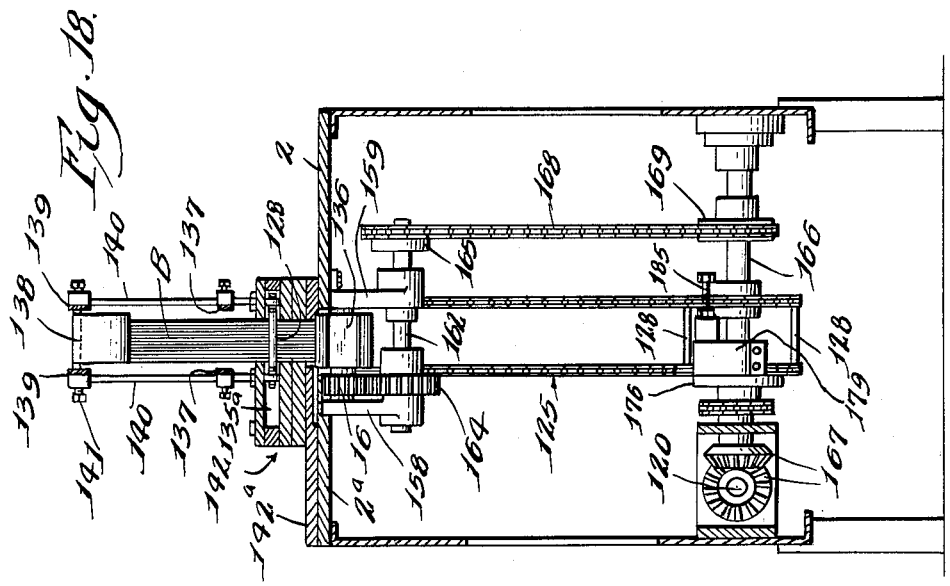
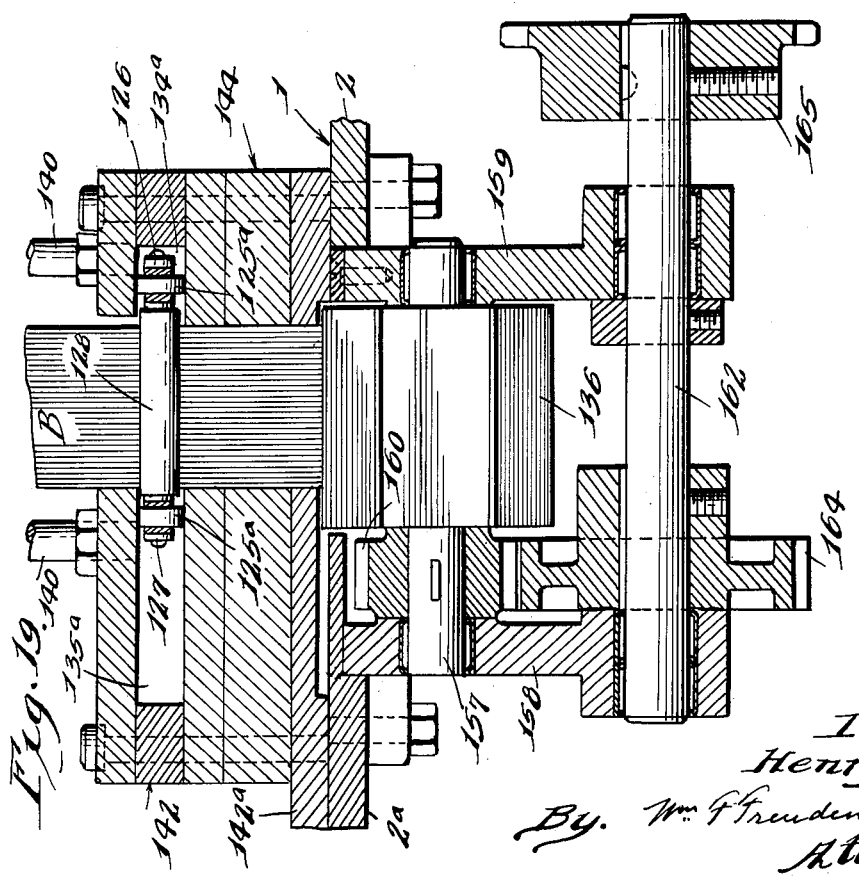
Inventor:
Henry Sieb.
By Wm F Freudenreich,
Attorney.

July 5, 1955  H. SIEB  2,712,141
MACHINE FOR GLUING BOOKS
Filed June 5, 1950  15 Sheets-Sheet 14
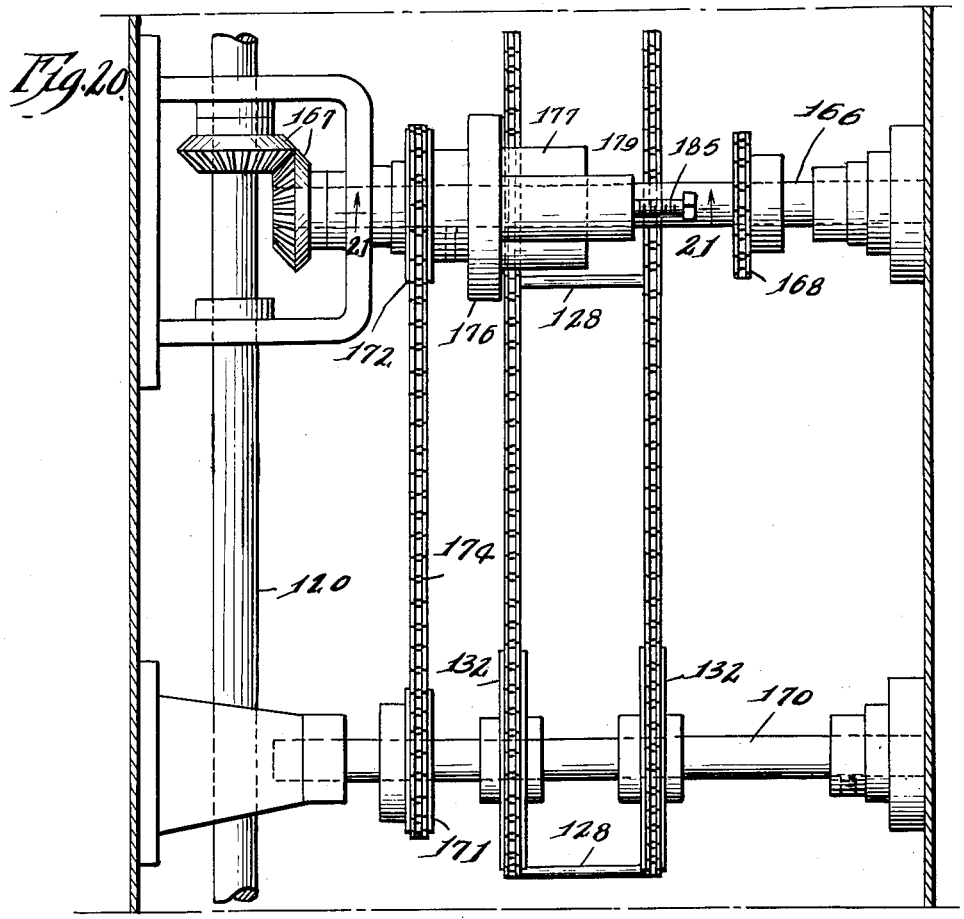
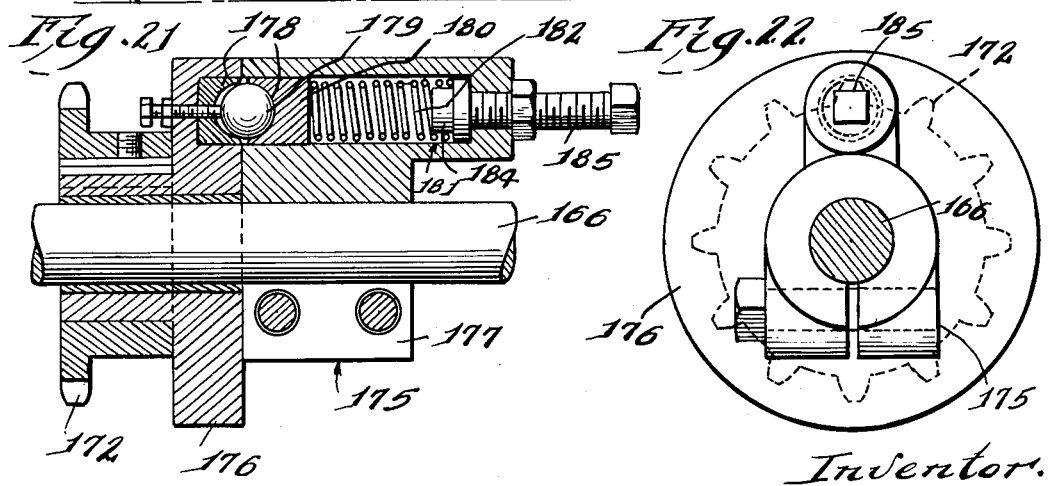
Inventor.
Henry Sieb.
By Wm F. Freudenreich,
Attorney.

July 5, 1955 H. SIEB 2,712,141
MACHINE FOR GLUING BOOKS
Filed June 5, 1950 15 Sheets-Sheet 15
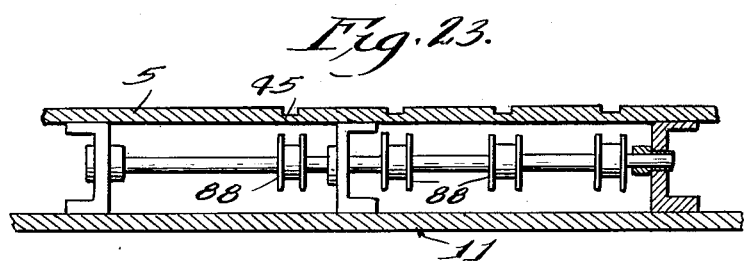
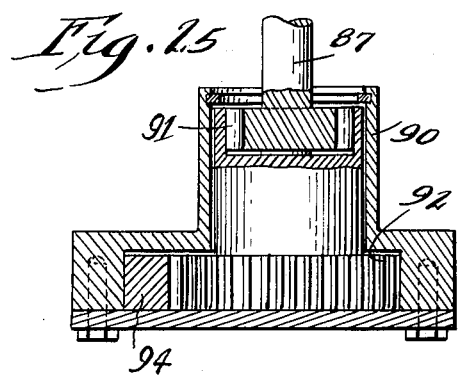
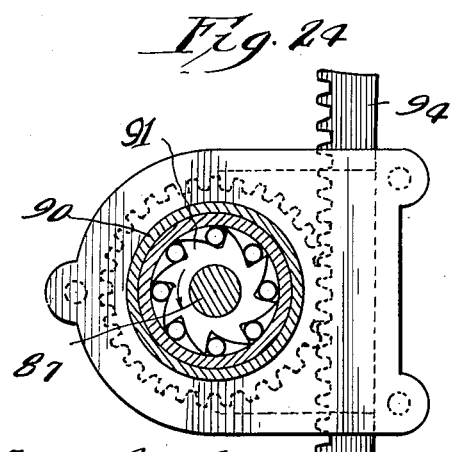
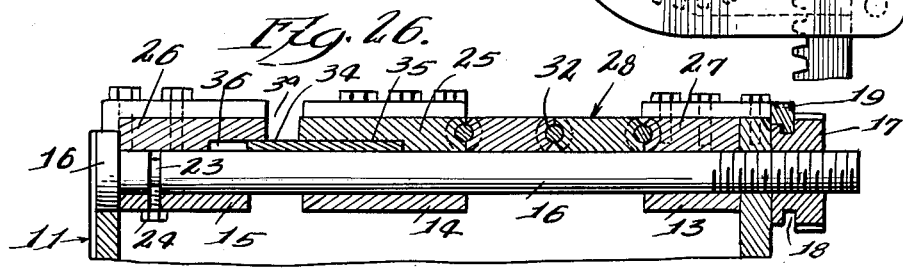
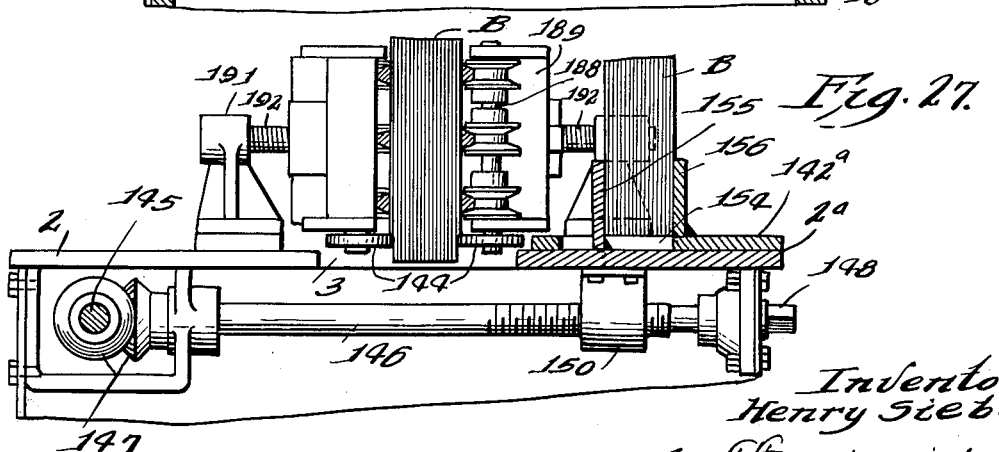
Inventor.
Henry Sieb.
By. Wm F. Freudenreich,
Attorney.

2,712,141

MACHINE FOR GLUING BOOKS

Henry Sieb, Hammond, Ind.

Application June 5, 1950, Serial No. 166,106

5 Claims. (Cl. 11—1)

In my prior Patent No. 2,169,114, there is disclosed a machine for applying glue to the back edges of books, after their respective groups of leaves or sections have been sewn together; and the present invention may be said to have for its main object to improve the construction and mode of operation of that machine to make it more efficient in performance and improve the quality of work done.

In my prior machine the books are carried through the same in batches, each batch comprising a considerable number of books arranged on edge, side by side, in contact with each other. Consequently, the workmen are required to assemble such batches in definite time relation to the movements of the mechanisms that carry the books through the machine.

One of the objects of the present invention is to produce a machine that automatically takes books, one at a time, from a mass thereof on an adjacent table and carries them through the machine to allow the necessary operations to be performed upon them; the workmen needing only to add more books at such convenient times as will insure that there will always be a book ready to begin its passage through the machine.

Further objects of the invention are to improve the manner of handling the books while moving through the gluing zone, and beyond the latter, so that the glue-receiving edges do not contact with anything except glue-applying rollers before reaching the discharge point; to "nip" or compress each book with great force adjacent to the sewn, back edge as it starts on its journey through the machine; in maintaining such compressed state while the glue is being applied; to permit the glue applying devices to be operated by hand before starting the machine; and automatically to stop the feeding of books into the machine in the event that the feeding mechanism becomes clogged.

Still further objects of the invention are to make provision for instant adjustment of the machine to accommodate books of different thicknesses; provide means to apply the glue successfully without the use of brushes; create a glue applying unit that need only be slid into place in the machine to become operatively connected to driving means and be ready for use; and provide simple and novel means to receive each book, as it is discharged from the machine, and support it long enough to enable a workman to grasp it.

Glues used in book making differ greatly from each other in the time required to dry, from the liquid state in which they are applied, to a dry state; so that, although some glues that must be very hot when applied and will dry in a few seconds, other glues will not dry until the books have gone from the gluing machine through a dryer. A further specific object of the present invention is to make it possible to use the same machine to apply either of these types of glue with the same machine.

Figure 8:
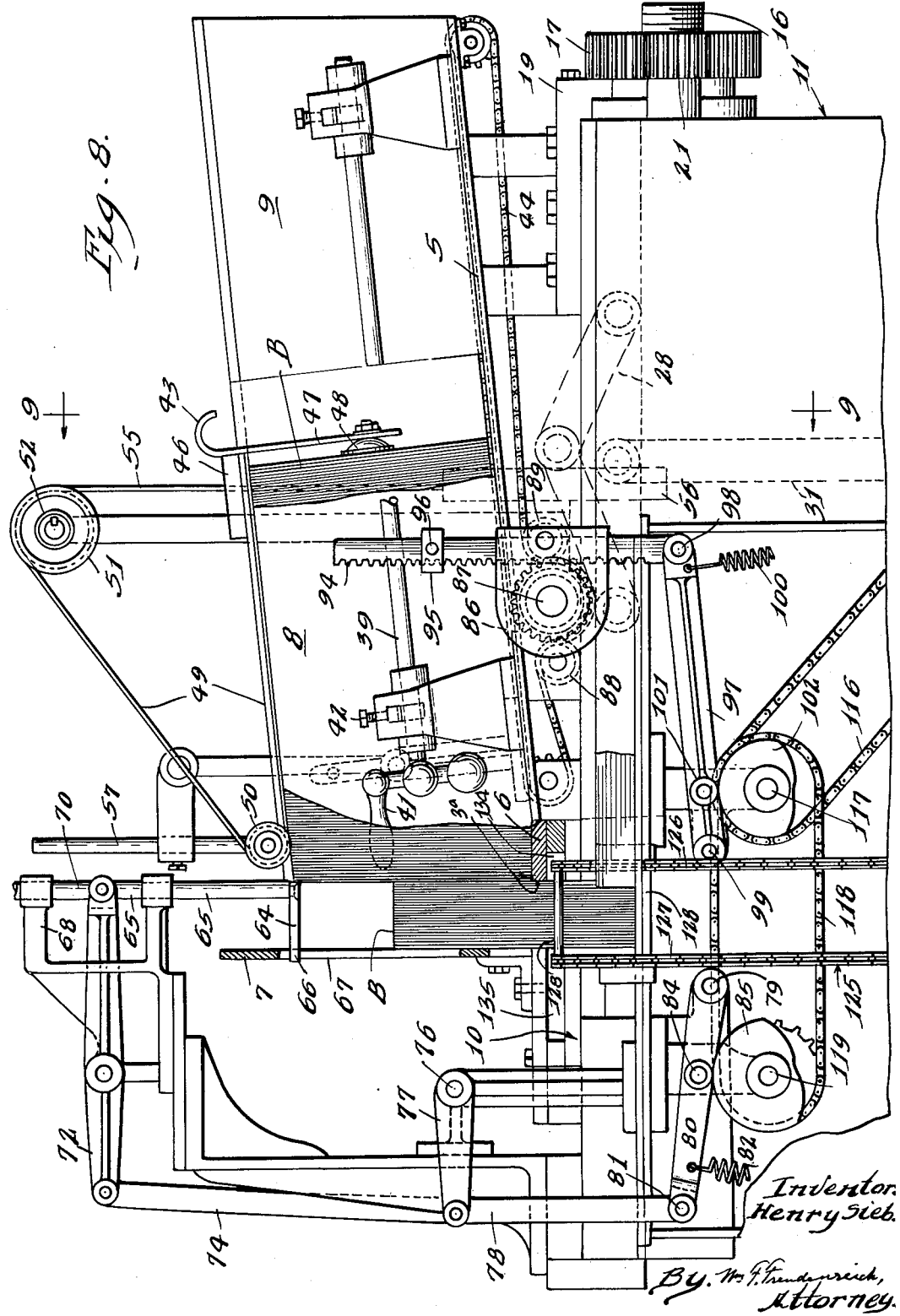
Figure 9:
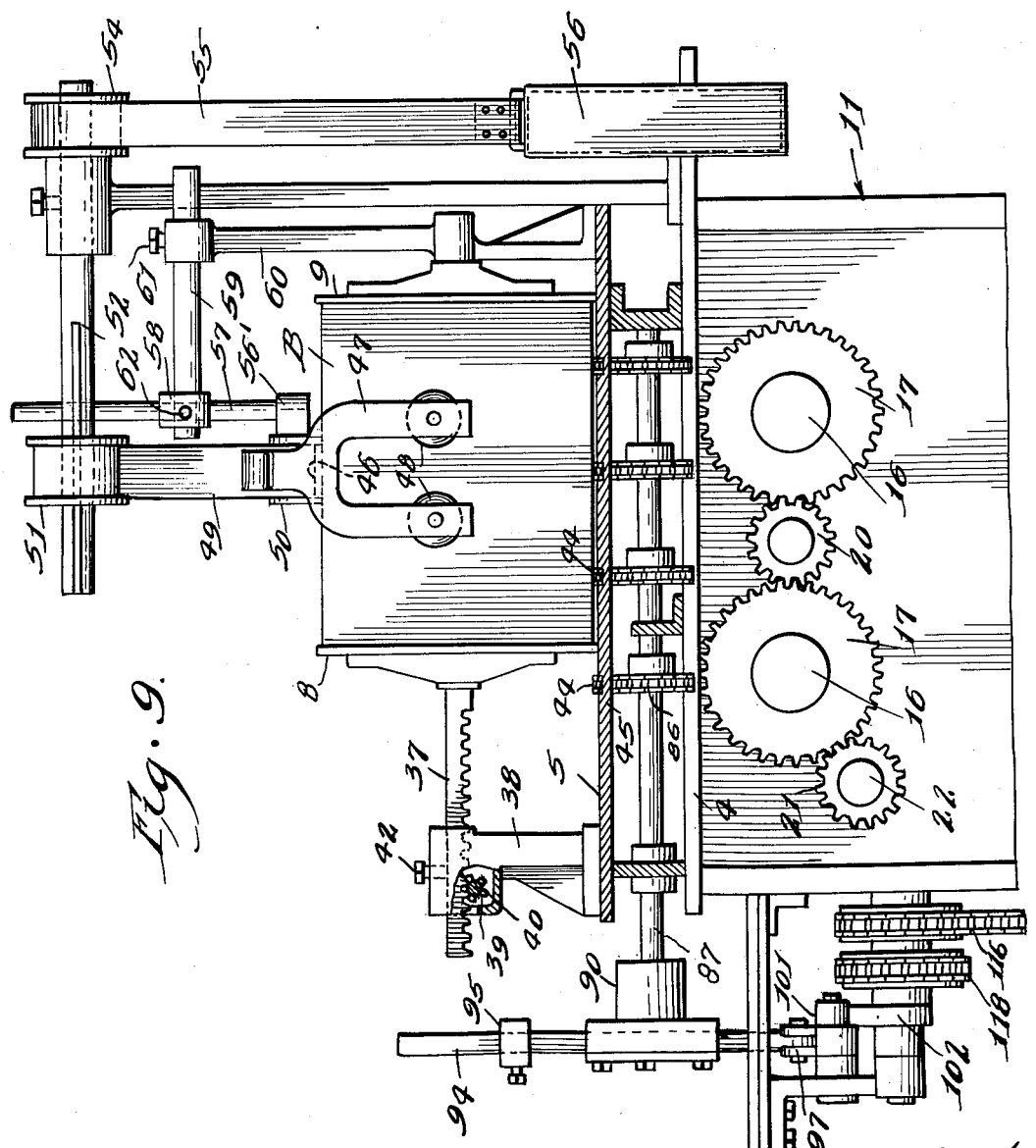

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figures 1, 2, 3 and 4 are views which, when arranged end to end, in slightly overlapping relation, form a side view of a complete machine embodying the present invention; Fig. 5 is the delivery end view of the machine, looking at the same from a point to the left of Fig. 4; Fig. 6 is a top plan view of that part of the machine shown in Fig. 1; Fig. 7 is a top plan view that bears the same relation to Fig. 2, except that it shows a shorter section than does Fig. 2, as does Fig. 6 with respect to Fig. 1; Fig. 8 is an end view of the upper part of the machine, on a larger scale, looking at the machine from a point to the right of Fig. 1; Fig. 9 is a section on line 9—9 of Fig. 8; Fig. 10 is a section on line 10—10 of Fig. 1, with the upper portion of the machine omitted; Fig. 11 is a section on line 11—11 of Fig. 10; Fig. 12 is a top plan view of a small section of the machine that forms the left hand portion of Fig. 2, but on twice the scale of Fig. 2; Fig. 13 is a section on irregular line 13—13 of Fig. 12; Fig. 14 is a section on line 14—14 of Fig. 3, but on a larger scale; Fig. 15 is a section taken approximately on irregular line 15—15 of Fig. 2; Fig. 16 is a section on line 16—16 of Fig. 2, showing only the glue-applying means and the adjacent part of the frame of the machine, on a large scale; Fig. 17 is a section on irregular line 17—17 of Fig. 2; Fig. 18 is a section on line 18—18 of Fig. 1; Fig. 19 is a view similar to Fig. 18, but on a much larger scale, and showing only a fragment of the machine; Fig. 20 is a section on line 20—20 of Fig. 1, but on a scale twice as large; Fig. 21 is a section, on a larger scale, on line 21—21 of Fig. 20; Fig. 22 is a view looking at the parts appearing in Fig. 21, from a point to the right of the latter; Fig. 23 is a transverse section through the feed table structure at a point where the sprocket chains run over deflecting rollers; Fig. 24 is a view, partly in side elevation and partly in section, of the clutch device intermittently driving the sprocket chains that move the books over the feed table; Fig. 25 is a transverse section through the device shown in Fig. 24, the clutch being in elevation; Fig. 26 is a section on a plane parallel to that of Fig. 10, showing the "nipper" means in a different position and showing, also, a part of the means for adjusting the nipper means to accommodate books of different thicknesses; and Fig. 27 is a section on line 27—27 of Fig. 6, showing the gauge for adjusting the main portion of the machine to accommodate books of various thicknesses.

Generally speaking, my improved machine contains: A receiving table on which books are placed in the form of a stack lying on its side; means to feed the recumbent stack lengthwise, step by step; means to detach the leading book and "nip" or forcibly compress the same in thickness along the lower edge; a jogging station, a glue applying station and a delivery station distributed in that order lengthwise of the machine; means to carry each book through the first two of these stations and into the delivery station; and means for quickly adjusting the machine to accommodate books of any thickness within a substantial range. Many of these component parts contain novel features that are of considerable and even great importance.

The stationary part of the machine is primarily a long, narrow, horizontal bed 1 composed in the main of two longitudinal members 2 and 2ᵃ spaced apart from each other a distance greater than the thickness of the thickest book to be handled, thereby providing a slot 3 in which books may travel through the machine. The bed is supported in an elevated position by a base 4 composed of a light frame structure and steel plates to give the whole a box-like appearance.

The book-receiving end of the machine is best illustrated in Figs. 1, 6, 8–11, 23 and 26. Here, on the front side of the machine and above the bed, is a transverse table 5 sloping rearwardly and downwardly to a slot 3ª that may be regarded as a section of the slot 3 between bed members 2 and 2ª; the table terminating at the slot in a sill 6. On the rear side of the slot, directly opposite the table and extending along the slot, is a vertical stop plate 7. On the table are two vertical side walls 8 and 9, between which are placed books B that are arranged on the table, rear edges down and parallel with the longitudinal axis of the machine. The mass of books may be moved inwardly and downwardly, with the innermost book engaging with stop plate 7 and dropping down into the slot. The stop plate is carried by a slide 10 having limited movements in the direction to vary the width of slot 3ª. For convenience, the table 5, with its sill and slide 10, are mounted on an auxiliary base structure 11 wider than and built into the base of the main machine, best shown in Figs. 10, 11 and 26. This auxiliary base structure has three spaced, parallel, longitudinal, slab-like top members 13, 14 and 15; the front member 13 and the middle member 14 being fixed, while the rear member 15 is slidable crosswise of the machine through a limited distance. Slide 10 is mounted on member 15 and is therefore movable from and toward sill 6 to vary the width of slot 3ª. Two heavy, headed bolts 16, 16 extend from front to rear of auxiliary frame and bed structure 11 through members 13, 14 and 15 and are provided on their front ends with nuts 17, 17 in the form of gear wheels. Each nut contains an annular groove 18 into which extends a lug 19 fixed to member 13. Between and meshing with both gear wheels is a pinion 20. A driving pinion 21 meshes with one of the gear wheels and is attached to the front end of a shaft 22 that extends to the rear side of the machine where it terminates in a non-circular end 22ª for receiving a handle to turn the same. Upon turning shaft 22, the gear nuts 17, 17 are turned in unison with each other and, since the nuts cannot move axially, the bolts 16 move lengthwise. The bolts are interlocked with member 15 of the auxiliary frame structure, so that said member must move with the bolts to narrow or widen the slot 3ª, depending on the direction in which the operating shaft 22 is turned. This interlock may consist, as shown in Fig. 26, in an annular peripheral groove 23 in each bolt, and set screws 24 carried by member 15 and entered in the grooves.

Whenever a book drops down into slot 3ª, it is squeezed under heavy pressure to flatten and compact it throughout a marginal portion along the sewn, back edge. This is done by a plunger 25 in the form of a thick, longitudinal plate slidable crosswise of the machine in member 14 and forming a portion of the front bounding wall for the slot. The plunger cooperates with an anvil 26 forming part of a single structure including slide 10 and member 15. Member 13 has on top thereof a part 27 similar to the anvil. In the gap between members 13 and 14 is a toggle 28 hinged at one end, at 29, to plunger 25 and at its other end, at 30, to part 27. When the toggle is straightened, as shown in full lines in Fig. 10, the plunger 25 projects a short distance into slot 3ª; and, when the toggle is collapsed, as shown in broken lines, the plunger is retracted clear of the slot. The toggle is operated by a vertical connecting rod 31, located in the base of the machine and journalled at its upper end on the toggle hinge pin 32.

To prevent the books from dropping through slot 3ª, I provide a thin, horizontal supporting plate 34 that extends across this slot, a considerable distance below sill 6 from which the books drop into the slot. Thus the slot 3ª, closed at the bottom by plate 34 becomes, in effect, a groove. As best shown in Fig. 26, the under side of this plate is flush with the under sides of elements 26 and plunger 25; the plunger being cut away on the under side to receive the plate. Element 26 is also cut away on the under side, as at 36, to allow that element to overlap the plate and be movable relatively thereto when adjusting the width of the slot 3ª and when the plate moves back and forth with the plunger.

Books come in different lengths as well as in various thicknesses. I therefore make the side walls 8 and 9 on the table adjustable from and toward each other. In the arrangement shown, the inner wall 9 is fixed, while wall 8 is movable. A pair of parallel rack bars 37 are fixed at one end to wall 8, near the ends of the latter and extend at right angles to the wall toward the near end of the machine. Each rack bar passes through a pedestal 38 mounted on the table. An operating shaft 39 for the rack bars spans the distance between, and extends through, the pedestals. On this shaft are peripheral teeth 40 meshing with the teeth on the rack bars. On one end of this shaft is a handle 41 for turning the same. Each pedestal may be provided with a set screw 42 to lock the corresponding rack bar in any position into which it may be moved.

The books on the table 5 do not rest directly on the same, but on the upper runs of a series of parallel endless sprocket chains 44 that overlie the table and extend at right angles to the longitudinal center of the machine. The table may have grooves 45 in the upper face; the chains running in these grooves and protruding therefrom a little above the table.

The chains or belts are aided in moving the books across the table by pressure applied directly to the outer side of the trailing book. For this purpose I provide a bar 46 that may rest on the upper edges of the books. A plate 47, which may be in the form of an inverted Y, as shown, is fastened to one edge of this bar so as to extend down and engage the outer side of the trailing book. Member 47 is provided at the upper end with a finger piece 43 and, toward the lower end, with flexible suction cups 48 that make the actual contact with the book. Fastened to the bar 46 is a flexible band 49, that extends inwardly and rearwardly of the machine, across the tops of the books on the table, to an idler pulley 50, underneath that pulley and upwardly and forwardly to a larger pulley 51 that serves as a drum or reel on which the band may be wound. Pulley 51 is fixed to a horizontal shaft 52 to which also is fixed a similar pulley 54. Fixed to pulley 54 is one end of a strap 55 from the other end of which is suspended a weight 56. Pulley 50 is mounted on an arm 56' on the lower end of a vertical rod 57 held in a sleeve 58 fixed to a horizontal rod 59; this rod being slidable lengthwise in a stationary supporting bracket 60. By loosening a set screw 61, rod 59 and pulley 50 may be shifted lengthwise of the machine to center the pressure plate 47 on books of different lengths. Also, upon loosening a set screw 62, pulley 50 may be raised or lowered, depending on the width of the books, so that the pull on the pressure plate may be parallel to the plane of the upper edges of the books on the table. Pulley 51 is keyed to shaft 52 so that while they must rotate together, the pulley may slide along the shaft as pulley 50 is adjusted lengthwise of the machine.

To insure that each book shall be freed from the pressure of the following book while it drops from the table into slot 3ª, I provide a shoe 64 which is directly over the slot 3ª and has its forward edge in the same vertical plane as the rear edge of sill 6. This shoe is carried on the lower ends of a pair of vertical rods 65, 65 that are moved up and down in a manner to be described later. The shoe has at the rear edge a part 66 which fits slidably in a vertical slot 67 in stop plate 7, so that the shoe is guided in its vertical movements and is braced by that plate, as the shoe comes down on top of a book and forms a barrier to hold back the next book. Rods 65 extend up through a stationary casting 68. The upper ends of the rods are connected together by a cross bar 69 on the upper end of a vertical actuator rod 70. The connections between the bar and rods 65 is one that permits these rods to be shifted up and down relatively to the actuator, set screws 71 serving to hold the rods in any adjusted position. The lower end of the actuating rod is connected to one end of a horizontal arm 72 that rocks in a vertical plane. The other end of this arm is connected to the upper end of a connecting rod 74 the lower end of which is connected to a radial arm 75 on a horizontal shaft 76 that extends beyond the table 5, almost to the near end of the machine. On this shaft is a second radial arm 77 from which depends a link 78; the arm and the link being beyond the auxiliary frame and bed structure 11. Hinged at its front end to structure 11, as at 79, is a lever 80, the rear end of which is connected, at 81, to link 78. A spring 82 tends constantly to swing lever 80 down. On lever 80 is a cam roller 84 that rests on cam 85 which revolves about an axis that extends lengthwise of the machine.

Since the means for turning cam 85 and the driving of sprocket chains 44 are closely related, the mechanism for doing both of these things will now be described.

The lower runs of the sprocket chains 44 run under sprocket wheels 86 on a shaft 87 arranged lengthwise of the machine below the table 5. Associated with each of these sprocket wheels are two flanged idler wheels 88 and 89, which serve to maintain the chains in contact with the wheels about half way around the same. This shaft extends out beyond the table on the side toward the near end of the machine where it enters a clutch housing 90. As shown in Figs. 24 and 25, the housing contains a conventional, one way clutch 91 and a gear wheel 92 to operate the same. Extending through and slidable in the housing is a vertical rack bar 94 the teeth on which mesh with those of the gear wheel and cause the shaft 87 to turn on the up stroke of the rack bar and to stand still on the down stroke. On the rack bar, above the clutch housing, is a loose sleeve 95 that may be locked in any position along the bar by means of a set screw 96. The lower end of the rack bar is connected to the forward end of a lever 97 at 98, the rear end of the lever being pivoted to auxiliary frame structure 11. A spring 100 tends constantly to pull the front end of the lever down. On the lever, near its rear end, is a cam roller 101 that rests on a cam 102.

Power for operating the machine is derived from any suitable source, a belt 104 being shown for that purpose. This belt runs over a pulley 105 on one end of a shaft 106 mounted in auxiliary frame structure 11 parallel with the longitudinal axis of the machine. On the other end of this shaft is a flywheel 107. A pinion 108 on shaft 106 meshes with a large gear wheel 109 mounted on a shaft 110 paralleling shaft 106. On shaft 110 is a pinion 111 that meshes with a second large gear wheel 112 fixed on a crankshaft 114 that is parallel to shafts 106 and 110. The lower end of connecting rod 31, for operating the "nipper" or compressor toggle, has arranged thereon a head 115 in which the crank element of the crank shaft has its bearing. A sprocket chain 116, running over sprocket wheels on the crank shaft and on the shaft 117 on which the cam 102 is mounted, serves to drive that cam. Another sprocket chain 118, running over sprocket wheels on shaft 117 and a sprocket wheel on the shaft 119 for cam 85, serves to drive cam 85. When the machine is in operation, one of the two cams moves the pressure shoe 64 up and down and the other causes the book feeding sprocket chains 44 to advance step by step.

The remainder of the mechanisms of which the machine is composed, and which will now be described, are driven from a main shaft 120 that extends throughout the length of the machine, from the receiving table to the delivery end, in the lower part of the base structure. This shaft is driven through a series of three pinions, 121, 122, and 124, the first of which is on the crank shaft and the last on the main shaft.

After a book has been lowered into slot 3ª and has been compressed, it starts to travel through the length of the machine. The first stage of travel is effected by an endless ladder-like belt 125, composed of two sprocket chains 126 and 127 connected together, at intervals much longer than any book to be handled, by cross pieces or rungs 128. The belt is provided with little rollers or wheels 125ª at the ends of the rungs. This belt runs over upper pairs of sprocket wheels 129 and 130 whose axes are at about the level of the top of bed 1 and which are disposed, respectively, between the table 5 and the near end of the machine, and at a considerable distance beyond the opposite or inner side of the table. Therefore the upper run of the ladder-like belt extends lengthwise of the machine a substantial distance above the top of the bed. Other pairs of sprocket wheels, 131 and 132, are disposed in the lower part of the base structure, below wheels 129 and 130, respectively. The lower run of the belt lies on the under sides of these lower sprocket wheels.

The upper run of the ladder-like belt actually lies in a plane just below the sill 6 at the inner end of table 5. The belt is substantially wider than the thickness of the thickest book to be handled, and the support for sill 6 and slide 10 contains belt-receiving grooves 134 and 135, respectively, that face each other. Groove 134 below the stationary sill need be only deep enough to house the forward sprocket chain 126, so that the latter will not be in the way of a book dropping off the sill into slot 3ª. Groove 135, on the other hand, must be deep enough to allow the slide 10 to move almost into engagement with sill 6, without having chain 127 bottom in that groove. The surfaces bounding the lower sides of the grooves 134 and 135 serve as tracks on which rollers 125ª on endless belt 125 run.

Endless belt 125 carries each book, after it falls into slot 3ª, lengthwise of the machine along slot 3, past a series of revolving, hexagonal rollers 136, which underlie slot 3 and jar or jog the book to flatten the under edge of the book, as in my aforesaid patent. Until the books reach the jogging rollers, they rest loosely on plate 34 (Figs. 6 and 10). In order to prevent the books from toppling over while being carried along by belt 125, elevated guide rails 137 are arranged on the bed on opposite sides of belt 125. Also, a row of wide yieldable pressure fingers 138, arranged between and depending from two parallel bars 139, arranged lengthwise of the machine on opposite sides of the line of travel of the books, engage the upper edges of the books and yieldingly hold the books down during this first stage of their travels. In order to adjust the pressure fingers to suit books of different widths, bars 139 may be mounted on slender posts 140, rising from the bed, so as to be slidable up and down on these posts; set screws 141 being provided to hold the rails at any desired distance above the bed. The guide rails 137 are also mounted on these posts and may be made adjustable in the same way as bars 139, if desired.

It is necessary that the distance between elements engaging the opposite sides of the books, from the time of entry between the guide rails 137 to the time of their discharge from the machine, be adjustable in accordance with variations made in the width of slot 3ª. I therefore mount all of such elements as are located on the rear side of slot 3 on a slide 142 that extends from the table to the discharge end of the machine. In that portion of this slide extending throughout the jarring or jogging zone, as best shown in Figs. 18 and 19, the cross section thereof is about the same as that of slide 10. In other words, the slide contains on its inner side a deep groove 135ª that is aligned with groove 135 in slide 10 and houses the rear sprocket chain 127 of the ladder-like belt 125. The bed of the machine is also provided with a superimposed stationary part 144 along the front side of slot 3, similar to member 142 except that it may be narrower because groove 134ª therein, that registers with groove 134, is shallower than groove 135ª.

Slide 142 may be adjusted from any one of several points along the machine. To this end I have provided a shaft 145 extending lengthwise of the machine near the front and just below the bed. At intervals along the machine are cross shafts 146 connected to shaft 145 by bevel gears 147 and having at their rear ends portions 148 adapted to be engaged in a socket of a handle member 149, shown in Fig. 2, for turning the same. As is clearly shown in Fig. 15, there is on each cross shaft 146 a nut 150 provided with a stem 151 that passes through a transverse slot 152 in the bed proper, and through what may be termed the main plate of slide 142. Consequently, when one of the cross shafts is turned manually it shifts the nut thereon transversely of the machine and, at the same time, turns the longitudinal shaft 145. The longitudinal shaft, in turn, rotates the other cross shafts 146, so that force is applied to the slide at several points distributed throughout its length, to shift the slide, whenever any one of the cross shafts 146 is turned.

In Figs. 6 and 27 there is shown a simple gauge for determining what the adjustment of slide 142 should be for any given book thickness. The main plate 142ᵃ of this slide contains a transverse slot 154 through which rises a vertical plate 155 fixed to the stationary bed. On member 142ᵃ is fixed a vertical plate 156 that is parallel to plate 155. The parts are so constructed that when a book is placed on edge between plates 155 and 156, and slide 142 is shifted to carry it nearer the longitudinal center of the machine until the book is compressed, the machine will be properly adjusted for handling that type of book.

The means for driving the ladder-like belt 125 and the jogging rollers will now be described, special reference being made to Figs. 1 and 18–22. Each of the jogging rollers is fixed on its own shaft 157 that is rotatably mounted in brackets 158 and 159 depending from the under side of the stationary bed of the machine. On each of these shafts is a pinion 160. Alternating with these pinions and meshing with the same are idler pinions 161. Also mounted in brackets 158 and 159 is a shaft 162 below and parallel to one of shafts 157. On shaft 162 is a gear wheel 164 that meshes with the overlying pinion 160. On one end of shaft 162 is a sprocket wheel 165. Mounted in the base of the machine, in the same horizontal plane as main shaft 120, is a transverse shaft 166, driven by the main shaft through bevel gears 167. A sprocket chain 168 embraces sprocket wheel 165 and a second sprocket wheel 169, on shaft 166.

It will be seen that sprocket wheels 132, over which belt 125 runs, are mounted on a transverse shaft 170. Also mounted on this shaft is a sprocket wheel 171, while on shaft 166, and in the same plane as wheel 171, is a loose sprocket wheel 172. A sprocket chain 174 runs over these two sprocket wheels. Between sprocket wheel 172 and shaft 166 is a clutch that normally allows the belt 125 to be driven continuously whenever the main shaft is running; but slips under an overload and stops the feeding of books by said belt. This clutch comprises a thick disc 176 fixed to gear wheel 172 and a member 177 fixed to shaft 166 by clamping or otherwise; members 176 and 177 having flat meeting faces arranged at right angles to the axis of the shaft. In each of these meeting faces is one half of a spherical cavity 178. Fitting rotatably in this cavity is a ball 179. One half of the bearing seat for the ball is in a block 180 that is slidable in a deep bore 181 in member 177; this bore being parallel to shaft 166. In the bore, behind block 180, is a compression spring 182 and a follower 184 engaged with the spring at the closed end of the bore. A screw 185 coaxial with the bore enters the latter through its closed end and bears against the follower to control the initial degree of compression of the spring.

As the books leave the jogging zone they are in condition to receive an application of the glue to their downwardly facing back edges. The books are no longer supported from below, but are gripped between two sets of endless belts that carry them along and leave their under edges exposed. There are two longitudinal rows of vertical, spaced, rotatable spindles 186 and 187 on each of which, as shown in Fig. 13, for example, are fixed three small flanged rollers 188. The spindles in each row are arranged in groups each of which is carried in a suitable frame 189. Each of these frames has two horizontal stub shafts 190 fixed to and projecting from their outer sides crosswise of the machine. Each stub shaft is mounted in a small pedestal 191 for limited lengthwise sliding movements. Surrounding each stub shaft, between the frame and the corresponding pedestal, is a compression spring 192. The pedestals on the front side of the longitudinal center of the machine are fixed to the stationary part of bed 1, whereas the other set of pedestals are mounted on the transversely slidable plate 142ᵃ.

On the lower ends of the spindles are rollers 194 in the form of thick discs of hard material. Each flanged roller or pulley 188 cooperates with the corresponding elements in the same row to support one run of an endless V-belt 195, of which there are three in each set. Each of these belts lies in a horizontal plane and embraces the corresponding spindle-carrying frame or frames. The distance between corresponding rollers on the opposite sides of the long axis of the bed is less than the width of the gap between the two sets of belts. Therefore, while the belts need only grip the books sufficiently to carry them along, the rollers 194 exert a very substantial compressive force on the books along the back edges.

The two rows of spindles, with their associated endless belts, extend through only so much of the length of the machine as appears in Fig. 2 and a short section at the right hand end of Fig. 3. It will be seen from Fig. 2 and Fig. 7 that just ahead of the spindle-supporting frames are a pair of triple pulley units 196 of large size. As best shown in Fig. 17, each of these units comprises a U-shaped bracket 197 so placed that its arms are horizontal, a vertical spindle 198 rotatably mounted between said arms, and three large flanged wheels or pulleys 199 fixed to the spindle. The bracket on the front side of the machine is secured to the stationary bed structure while the other bracket is mounted on slide 142. The pulleys are in the same horizontal planes as the corresponding small pulleys 188, and are so positioned transversely of the machine that the line of each belt as it contacts the row of small pulleys is tangent to the corresponding large pulley. The V belts extend from the small pulleys around the large pulleys and then back along the machine to driving pulleys.

The driving pulleys for belts 195 are at the opposite end of the two rows of spindles, with their small pulleys, from that at which pulley units 196 are located. They differ from the other large pulleys in some respects. As best shown in Figs. 3 and 14, each driving pulley unit comprises a bracket 200, similar to brackets 197 and similarly mounted on the machine; together with a vertical shaft or spindle 201 rotatably supported in the arms of the bracket. Instead of three pulleys on each shaft or spindle, there are six, three pulleys 202 alternating with three similar pulleys 203; pulleys 202 being in the same horizontal planes as the corresponding large pulleys heretofore described, while the other three serve to drive a second set of belts to be described later. Spindles 201 extend down through the bed of the machine. Within the base of the machine, directly below the spindles 201, is a transverse shaft 205 driven from the main shaft 120 through bevel gears 206. A short vertical section of shaft 207, directly over shaft 205, is driven by the latter through bevel gears 208. A connecting shaft 209 is attached at its ends to the upper end of shaft 207, and to the lower end of the rear shaft or spindle 201, by universal joints 210 and 211, respectively. On shaft 209 is a slip joint 212 to compensate for shifts in the position of the spindle crosswise of the machine, when adjusting the machine to operate on books of any given thickness. The rear spindle 201 is shown as being driven from shaft 205 by a driving connection 214 similar to the one just described.

Belts 195 extend around pulleys 202 just as they do in the case of pulleys 199, in endless fashion. The belts must be kept taut. This is accomplished by belt tighteners shown in elevation in Figs. 2 and 3, and in detail in Figs. 12 and 13. It will be seen that there are on each half of the bed three brackets 214, 215 and 216, similar to the brackets 197, close to the driving pulleys. Brackets 214 and 216 are fixed to their immediate supports, whereas bracket 215 is adjustable relatively to the others transversely of the machine, between guide rails 217. Lugs 218 rise, outwardly from brackets 215 and between the corresponding guide rails, from slide plate 142ª and a stationary part of the front half of the bed, respectively. A screwthreaded stem 219 extends from each bracket 215 through the corresponding lug 218, and has nuts 220 on its outer end. Each bracket supports a vertical spindle 221 similar to spindles 198. On the spindles in brackets 214 and 216 are plain, long cylindrical rollers 222. On the spindles in brackets 215, however, are three large pulleys 224 that may be similar in size and shape to idler pulleys 199 and be similarly spaced. The outer runs of the belts 195, near the driving pulleys, pass on the inner sides of the drums in brackets 216, around the outer sides of pulleys 224 and then across the inner sides of the remaining drums. Therefore, by pulling the brackets 215 away from the axis of the machine, the belts may be drawn into loops of varying sizes, as shown in both full and broken lines in Fig. 12, to place the belts under any desired tension.

It will be seen from Fig. 1 that the ladder-like endless belt 125 carries the books from the joggers directly into the gap between the opposed sets of large idler pulleys 199, to be gripped firmly between the inner runs of belts 195. The belts 195 now carry the books over glue applying apparatus, with the lower edges of the books left completely exposed in the central slot 3 in the bed.

The glue applying apparatus is best shown in Figs. 2, 15, 16 and 17. Glue in liquid form is placed in a pot 225 that may be set in the top of a large rectangular reservoir 226 to contain oil for keeping the glue hot. The rear wall of the base structure contains a large window 227 just below the inlet end of the gluing zone. Within the base, between the top and bottom of the window, is a horizontal platform 228. The glue pot unit rests on this platform and can be slide into and out of position through the window; transverse guide rails 229 on the platform serving both to guide the in and out movements of the unit and to hold it down on the platform. The glue pot unit includes, in addition to the reservoir and the pot, two rollers 230 and 231, that extend crosswise of the machine and project above the pot far enough to touch the bottom edges of books carried across the same by belts 195. Each roller is mounted on a shaft 232 that extends past the inner or forward end of the glue pot and is there provided with a pinion 234. On platform 228, inwardly from the glue pot unit, are two pedestals 235, one under each of said pinions 234. Projecting from each of these pedestals toward the glue pot unit is a stub shaft 236 on which is rotatably mounted a sprocket wheel 237 to which is fixed a pinion 238 that meshes with the corresponding pinion 234. The driving connection between the sprocket wheels and the glue applying rollers is made and broken by the simple act of sliding the glue pot unit into and out of working position. Below the glue pot unit position, within and at the level of the main shaft 120, are two transverse shafts 239 and 240, the first of which is driven from the main shaft by bevel gears 241. Loose on shaft 239 is a gear wheel 243, and a similar gear wheel 244 is fixed to shaft 240; the two gear wheels being in mesh with each other. These latter gear wheels have sprocket wheels 245 fixed thereto. Each of the sprocket wheels 245 drives the corresponding sprocket wheel 237 by a sprocket chain 246 which cooperates with both of them. Since gear wheels 243 and 244 mesh with each other they must turn in opposite directions and, consequently, the glue applying rollers must also rotate in opposite directions. The parts are so arranged that when a book contacts a roller 230 the surfaces in contact with each other are moving in the same direction and, therefore, that roller lays a layer of glue on the edge of the book. The part of glue roller 231 that contacts the book moves in the opposite direction from that in which the book is going and, therefore, serves to push the glue up into the crevices between the sections of the book. The glue cannot be forced up too far between the book sections because each book is being held in a compressed state between the two rows of little rollers 194 while being acted on by the glue rollers.

Each glue roller is provided with a scraper 247 to keep it clean. When a machine stands idle over night the glue on the rollers hardens. It is therefore advisable to rotate the rollers the next morning so that the scrapers may clean off hardened glue before the machine is started. I have therefore provided means to turn the glue-applying rollers independently of the main drive shaft. For this purpose I key to shaft 239, besides gear wheel 245, a bracket 248, provided with a spring pressed plunger 249 that tends constantly to snap into a hole 250 in gear wheel 243, when brought into registration therewith. Normally the plunger extends into hole 250 and locks gear wheel 243 to its shaft. When the plunger is withdrawn from the hole and is latched in its release position, the drive for the glue rollers is disconnected from the main shaft. Thereupon, by turning shaft 240 by means of a crank 251 on its rear end, the glue rollers may be rotated independently of the main shaft.

After the glue has been applied to their back edges, the books are preferably left in the machine for a few seconds to allow the glue, if of the quick-drying synthetic type, to set before the books are discharged. To accomplish this I provide a second book-gripping and feeding assembly that may be similar to the one in which belts 195 are the sole conveyors, just described; the component parts being the same in both instances except that the little pressure rollers 194 are not needed in the second assembly. The spacing between the belts 253 of each group in the last book-gripping and feeding assembly are the same as between the belts 195, but all of the belts 253 must be at higher levels in order to be received in the extra three pulleys 203 in each of the two driver pulley units. One may use pedestals 254 that are higher than the pedestals 191 used to support the groups of small pulleys 188 in the glue-applying zone, or shims may be placed under pedestals like the latter pedestals. Large idler pulleys 199, as shown in Figs. 3 and 17, may be used with belts 253, because one need only turn such pulley units upside down to place the pulleys in position to take belts located at the levels of belts 253. This is made plain in Figs. 4 and 5, where the large idler pulleys 254 at the discharge end of the machine are mounted in brackets 255; these parts, although being given different numbers from those designating the other pair of large idler pulley units, being the same as in the latter units.

Since no operations are performed on the books while they are being carried along by the second sets of triple belts, no further description of the details of this last section of the machine proper is needed.

When quick-drying synthetic glue is employed, the glue has become set and dry when the books emerge from between the belts at the delivery end of the machine. However, when glue is of a type that does not dry until the books are placed in a drying chamber, care must be taken in handling them as they are discharged from the machine. I have therefore shown in Figs. 4 and 5 special attachment for receiving from the machine books on which the glue is still wet.

The said attachment comprises a narrow pan or tank 256, for water, fixed to and extending axially of the machine in both directions with respect to the end wall 4ª of the base structure 4 of the machine; this wall being cut away above the pan clear to its upper edge. In the pan is a roller 257, of large diameter and rotatable about an axis extending crosswise of the machine. Two long, narrow plates, 258 and 259, are supported on the base structure on opposite sides of the gap or slot 3 in the bed of the machine and at the level of the under edges of the books emerging from the machine. Supported on the under side of the bed of the machine in registration with the central slot in the latter and with its axis being approximately in a transverse, vertical plane containing the axes of the pulley 254, is a large roller 260. A small roller 261, also rotatable about a transverse axis is supported underneath the outer ends of plates 258 and 259. An endless belt 262 embraces rollers 257, 260 and 261, and also passes over an idle roller 264 within the pan and close to roller 257. Rollers 260 and 261 are disposed at such levels that the upper run of the belt 262 is horizontal and at or slightly below the level of the under edges of oncoming books. Guard rails 265 rise from plates 258 and 259 on opposite sides of the upper run of belt 262, so that books received on the belt and carried along the same will not topple over. Belt 262 must be driven in such manner that the upper run travels in the same direction as the oncoming books and at a speed which is at least not lower than that of the books. In the arrangement shown, roller 260 is fixed on a transverse shaft 266 on which is a sprocket wheel 267. Below shaft 266, at the level of main shaft 120, is a shaft 268 driven by the latter through bevel gears 269. On shaft 268 is a sprocket wheel 270. A sprocket chain 271 embraces sprocket wheels 267 and 270 to drive the belt 262 whenever the main shaft is running.

The manner in which the machine operates has been explained, in the main, along with the description of the structural features. A brief summary of the operation, when using glues that require the books to be placed in a drier upon leaving the machine follows.

Pan 256 is filled with water so that a large section of belt 262 is at all times immersed. Slide 10 is adjusted to give gap 3ª, between sill 6 and the forward edge of the slide the proper width to allow one of the books to be glued to slip easily down into the same. One of the books is then set between gauge elements 155 and 156, back edge down, and slide 142 is shifted forward until the book is compressed to such an extent that strong resistance to further compression is offered by the book. Slide 142 may then be backed off, the book be removed, and the slide returned to the position previously determined. The movable side wall 8 on table 5 is then adjusted so that it is separated from the opposite wall 9 by a distance equal to the length of the book to be handled. Sleeve 95 is adjusted along rack bar 94 to cause the conveyor chains 44 to move through steps equal to the thickness of one of the books, in an uncompressed state, during each revolution of cam 102. Also, the supporting rods 65 for shoe 64, that moves down on each book entering slot 3ª, are adjusted so that when the shoe is down it is spaced apart from book-supporting plate 34, a distance equal to the width of one of the books. The tension devices for the various belts are checked, and adjusted, if necessary. Adjustments are made in the means for supporting flexible band 49 so that the section overlying the books will be parallel with the top of table 5, when the table is loaded with books. The glue rollers are rotated manually, by crank or handle 251, to allow the scrapers to clean off any hardened glue thereon; plunger 249 being latched in its release position while this is being done, thereby to interrupt the driving connection between the main shaft and the glue applying rollers. Fresh glue is then placed in the pot; and the machine is ready to operate.

Books are placed on table 5, with their back edges down, parallel with the longitudinal axis of the machine, the first book being placed in slot 3ª. After the space between walls 8 and 9 has become filled, bar 46, with plate 47 attached, is pulled forward until said plate can be lowered to bear against the outer side of the endmost book, while bar 46 rests on the top edge of that book and perhaps one or more adjacent books, depending on the thickness of the books.

It may be assumed that shoe 64 is up out of the way, that plunger 25 that is operated by the toggle to compress each book entering the slot 3ª is in the retracted position, and that the feed chain 44 on the table will not be ready to move immediately upon starting the machine.

As soon as the machine is started "nipping" plunger 25 is thrust out into the slot and compresses the book along its back edge. By the time that the plunger is retracted, a rung on the ladder-like belt engages a vertical edge of the book and carries the book toward and then through the jogging zone. As soon as the first book is out of the way, feed chains move a second book into registration with the slot, and shoe 64 comes down and aids the downward movement of that book into the slot; said shoe at the same time moving down the adjacent face of a third book standing at the edge of the slot, and forming a barrier to further advance of that book until the shoe again moves up. Each book entering the slot is compressed and then carried away by belt 125.

As the first book reaches the jogging zone it stands free to the extent that it would drop down through slot 3 in the main bed of the machine, except for the support given by the underlying jogging rollers. The result is a jarring of the book that squares it at the back, the back edge becoming flat. While in this condition the book is delivered to the glue-applying zone, being gripped between the inner runs of the two groups of belts 195 and between the little, hard rollers 194; these rollers engaging the books in the same zone that was compressed in the "nipping" device. As the book is carried along, its lower edge engages the glue applying rollers, one after the other, the first of these rollers simply laying a layer of glue on the squared back edge of the book, while the second roller, running in the opposite direction, adds glue and thrusts it up into the crevices between the sections of which the book is composed. Belts 253, beyond the glue-applying zone, simply carry the book, without receiving any support from below, to the discharge end of the machine. There the book is deposited on the wet belt 268 that carries it onward a short distance, between guides, to give an attendant the opportunity to grab it and start it on the way to a drier. A little of the glue may be left on the wet belt, but this is washed off as the belt is drawn through the water.

The books follow each other through the machine in rapid succession, namely, from sixty to eighty a minute.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. In a book handling machine, a stationary support provided with a table and having therein, along one edge of the table, a groove that is a little wider than the thickness of a book to be handled; guides, spaced apart a distance equal to the length of a book and arranged at right angles to the groove, rising from the table; feed mechanism to move books standing on edge on the table between the said guides step by step across the table to the groove; a shoe mounted on the support beside the groove at the level of and movable into and out of the groove to engage the side of a book in the groove and compress it; means to operate the shoe in such time relation to said feed mechanism that it performs a compressing stroke between feeding steps of the latter mechanism; a device movable beside and in the direction of the length of the groove having thereon elements that project across the grooves; and means to drive said device in such time relation with the movements of the shoe that each said element arrives in book-engaging position while the said feed mechanism is stationary and the said shoe is clear of the groove.

2. In a book handling machine, a long bed, an endless ladder-like conveyor belt having a run above and extending lengthwise of the bed, means to drive the belt continuously, the distance between the rungs in the belt being substantially greater than the length of a book to be handled, means to deposit on the bed, behind and near each rung, as the latter reaches a predetermined point, a book on edge and parallel to the longitudinal axis of the machine, book nipping devices, including a movable shoe, in position to grip and compress each book while the latter remains where it was initially deposited, as aforesaid, means intermittently to operate said nipping devices in such time relation to the movements of the conveyor as to cause the shoe to engage each book and again release it before the conveyor travels far enough to bring the nearest following rung into engagement with the rear end of the book.

3. In a book handling machine, an elongated horizontal bed having at the receiving end a stationary vertical stop plate arranged parallel to the longitudinal axis of the machine, a table beside the bed opposite the stop plate, spaced guides rising from the table and standing at right angles to said stop plate to receive between them books standing on edge on the table parallel to the stop plate, a device exerting a constant, yielding pressure against the upper part of the outer side of the outermost book on the table in the direction to force the books against the stop plate, book shifting devices on the table engaged with the under edges of the books, means to shift the said shifting devices step by step in the direction to carry the books toward the stop plate, and means movable over the bed longitudinally of the machine to carry books along the stop plate lengthwise of the machine.

4. A machine as set forth in claim 3 having, in addition, a presser foot parallel to the stop plate, and means to move the latter in a manner to compress the lower marginal portions of the books, standing still against the stop plate, between that plate and the foot.

5. In a book handling machine, a long horizonal bed having at the receiving end a vertical, stationary stop plate arranged parallel to the longitudinal axis of the machine, a table beside the bed opposite the stop plate, spaced guides rising from the table and standing at right angles to the stop plate to receive between them books standing on edge parallel to the stop plate, means intermittently feeding books between said guides toward and against the stop plate, means to compress the lower marginal portion of each book while it is engaged with the stop plate, and means to engage a vertical edge of each book reaching the stop plate and move the book along the latter lengthwise of the bed in coordinated time relation with the operation of the feeding and compressing means.

References Cited in the file of this patent

UNITED STATES PATENTS

| Number | Name | Date |
|---|---|---|
| 166,087 | Field | July 27, 1875 |
| 703,933 | Joyce, Jr. | July 1, 1902 |
| 845,369 | Murray | Feb. 26, 1907 |
| 1,023,569 | Juengst | Apr. 16, 1912 |
| 1,127,538 | Staude | Feb. 9, 1915 |
| 1,251,701 | Sherwood | Jan. 1, 1918 |
| 1,297,131 | Etheridge | Mar. 11, 1919 |
| 1,392,117 | Clark | Sept. 27, 1921 |
| 1,454,299 | Strom | May 8, 1923 |
| 1,720,680 | Kleineberg | July 16, 1929 |
| 1,804,392 | Alger | May 12, 1931 |
| 1,855,207 | Steinmann | Apr. 26, 1932 |
| 1,867,803 | Bredenberg | July 19, 1932 |
| 1,886,378 | Dearsley | Nov. 8, 1932 |
| 2,122,510 | Bergstein | July 5, 1938 |
| 2,163,812 | Schramm | June 27, 1939 |
| 2,169,114 | Sieb | Aug. 8, 1939 |
| 2,189,929 | Schramm | Feb. 13, 1940 |
| 2,288,031 | Schaefer et al. | June 30, 1942 |
| 2,572,243 | Cashin | Oct. 23, 1951 |
| 2,585,433 | Burls | Feb. 12, 1952 |